United States Patent

[11] 3,561,340

| [72] | Inventor | Irving Erlichman<br>Wayland, Mass. |
| --- | --- | --- |
| [21] | Appl. No. | 801,428 |
| [22] | Filed | Feb. 24, 1969 |
| [45] | Patented | Feb. 9, 1971 |
| [73] | Assignee | Polaroid Corporation<br>Cambridge, Mass.<br>a corporation of Delaware |

[54] REMOVABLE PROCESSING ROLLER ASSEMBLY FOR A SELF-DEVELOPING CAMERA
15 Claims, 4 Drawing Figs.

| [52] | U.S. Cl. | 95/13,<br>95/89 |
| --- | --- | --- |
| [51] | Int. Cl. | G03b 17/52 |
| [50] | Field of Search | 95/13, 14 |

[56] References Cited
UNITED STATES PATENTS
2,740,340  4/1956  Bing et al.  95/13

*Primary Examiner*—John M. Horan
*Assistant Examiner*—Kenneth C. Hutchison
*Attorneys*—Brown and Mikulka, Robert E. Corb and Leonard S. Selman ABSTRACT: A camera including a pair of processing rollers which are easily removable from the camera for cleaning, repairs, etc. The rollers are mounted on a removable chassis, and a drive rotates the rollers so as to advance the film units between the rollers for processing. Biasing springs on reciprocating plungers on the camera body urge one roller toward the other for applying pressure to the film units while the same biasing elements also serve to retain the processing elements in operative position on the camera body.

3,561,340

INVENTOR.
IRVING ERLICHMAN

BY Brown and Mikulka
and
Leonard S. Selman
ATTORNEYS

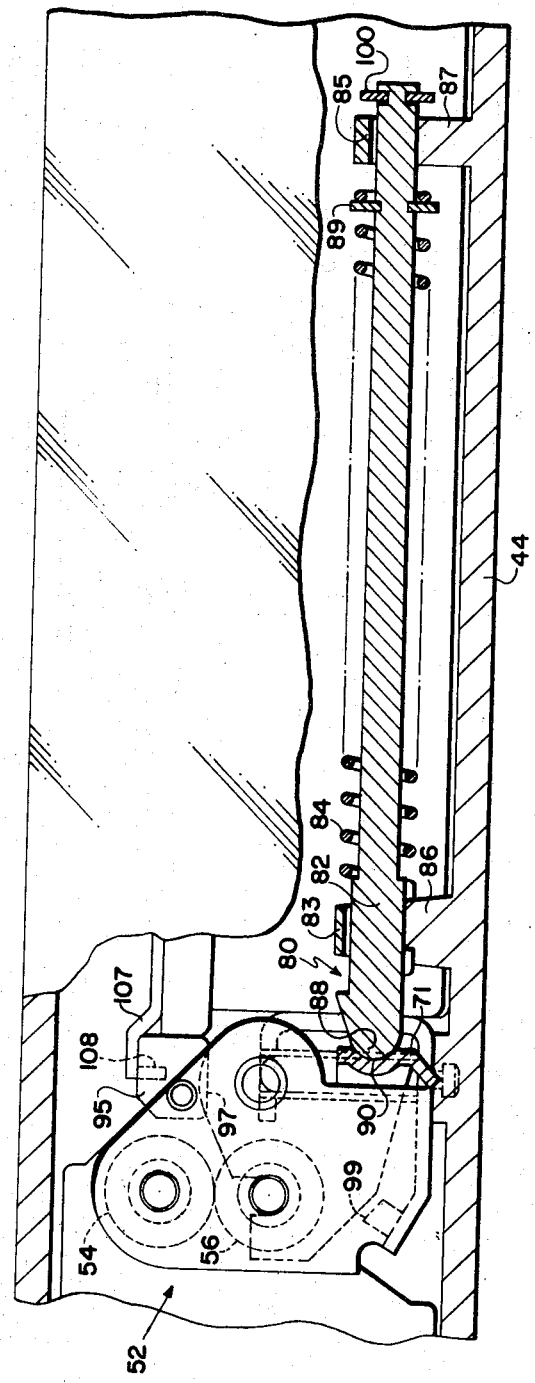

3,561,340

REMOVABLE PROCESSING ROLLER ASSEMBLY FOR A SELF-DEVELOPING CAMERA

The present invention is concerned with photographic apparatus, such as a self-developing camera, incorporating a processing system including a pair of pressure-applying members for processing film units within the camera by distributing a liquid agent in contact with the exposed photosensitive element of each film unit, and specifically, with a processing system or means having components designed to be easily removed from the camera to facilitate cleaning, repair and the like. The preferred form of camera is adapted to be employed with a film assemblage or pack including a container housing a plurality of photographic film units arranged to be exposed in sequence within the container and withdrawn therefrom following exposure. Subsequent to being withdrawn from the container through an opening therein, each film unit including, for example, a photosensitive element, a superposed image-receiving sheet and a container or pod of processing liquid, is processed by moving the container and superposed elements through the processing means between the pressure-applying members thereof. The camera includes structure for moving each film unit from the container after exposure which may take the form of a film engaging member mounted for reciprocating motion toward and away from the film container to engage and move an exposed film unit from the film container into engagement with the processing means.

The processing means includes a pair of juxtaposed pressure-applying members, in this case, rollers which are driven in opposite directions to move the film units between them while causing said pod to open and distributing the processing liquid between the superposed film elements. Each film unit, following exposure, is advanced with the pod foremost, by the above-described film moving means into the bite between the rollers. In order to accommodate the varying thickness of each film unit and apply pressure to the film units, the rollers are mounted for relative movement toward and away from one another and biased toward one another. In a preferred embodiment, one of the pair of rollers is rotatably mounted directly on a chassis and the other roller is rotatably mounted on a support means movably connected to the chassis. The means for biasing the movably mounted roller toward the other roller (mounted on the chassis) are mounted on the camera body and include a pair of spring biased, reciprocating members engaged with the support means for causing movement thereof to urge the roller mounted thereon toward the roller on the chassis. As an important feature of this invention this same biasing means serves to retain the removable processing means in its operative position on the camera body. The chassis has a pair of openings therein which receive a pair of positioning members extending from the camera body to position the processing means in its operative position. The biasing means which engage the support member coact with the positioning members, in effect, to clamp the processing means in operative position. The positioning members which may be pins, or the like, support the chassis against the biasing means.

The camera includes drive means, preferably an electrically powered motor, and suitable transmission means connected in driving relationship to transmission means on the rollers. Thus after each exposure, the film units are automatically driven at an optimum predetermined speed between the rollers resulting in uniform distribution of the processing liquid between the film elements.

Since both the processing rollers and their connected transmission means are mounted on the single chassis, the removal of the rollers for cleaning, repairs or even the complete replacement thereof is greatly facilitated. After continued use of the rollers and their drive structure and other processing structure on the chassis, a certain amount of cleaning is desirable. Although the processing liquid in normal use is completely entrapped within the film, some small amount of fluid may sometimes escape and lodge on one of the rollers, for example. By simply lifting the chassis from its operative position, which takes a few seconds, one may clean the rollers by placing them under water running from a faucet or even completely immerse the chassis and related processing structure in water. The relatively few parts of the structure may be made of stainless steel, or the like, so that the water will not have any detrimental effect. The ease of removal and replacement of the processing means is also a great advantage in the event that the rollers or other processing structure were damaged since the camera would only be out of use for the few moments it would take to insert a new unit.

Accordingly, objects of the invention are: to provide in a self-developing camera of the type described, processing means including a pair of pressure-applying rollers, readily and easily removable as a unit from the camera; and to provide a camera of the type set forth including the same biasing means for biasing one roller toward another for applying pressure to a film unit as it passes between the rollers during processing and for retaining the removable processing means in its operational position in the camera.

Another object of this invention is to facilitate the easy and fast removal of the processing means of a self-developing camera for cleaning, repair, or the like, and for returning the processing means to its proper operative position on the camera body.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is an elevational view, partly in section showing the biasing means engaging the processing means within the folded camera body.

The photographic apparatus of the present invention may be any one of the various well-known types of apparatus in which film is exposed and processed, particularly a self-developing camera such as shown and described in the copending U.S. Pat. application of Edwin H. Land et al., Ser. No. 655,850, filed Jul. 25, 1967, which include means for exposing and instantly processing film units with which the camera is employed.

Figure 1:
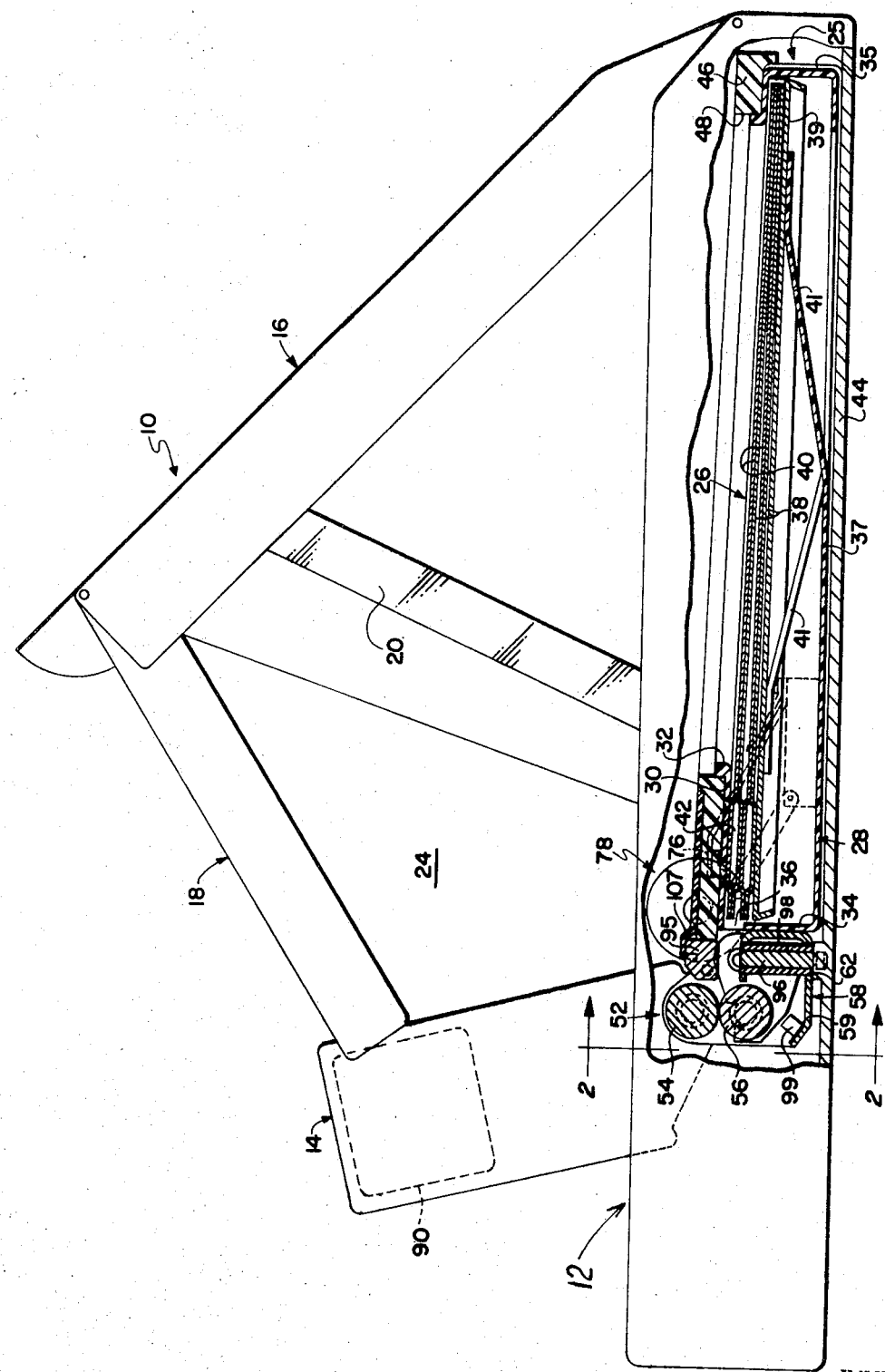
FIG. 1 is a side elevational view, partly in section, of a camera including the removable processing means, shown with a photographic film assemblage loaded therein.

A camera of the type embodying the present invention is illustrated in FIG. 1 of the drawings and generally indicated by the reference numeral 10. Camera 10 is shown as having a hexahedron configuration including four relatively movable housing sections. These sections include a base or principal body section 12 to which is pivotally coupled a forward section 14 including a lens and shutter assembly, an intermediate section 16 pivotally connected at the opposite end of body section 12; and a connecting section 18 pivotally coupled at its ends to forward section 14 and intermediate section 16. An erecting link 20 is provided for aiding in pivoting the sections of the camera from a folded position into the erect position shown in FIG. 1 and retaining the sections in erect position. The camera may include a conventional exposure system comprising, for example, a lens, an aperture and, preferably, an electrically energized shutter, mounted within forward section 14. The main body section 12 is constructed to provide a storage chamber for holding a film pack or container of film units and locating one of the film units in position for exposure. The optical path between the exposure system in forward section 14, and a film unit positioned for exposure within body section 12 includes a mirror (not shown) mounted within intermediate section 16. The camera includes a collapsible bellows or boot 24 connected to body section 12, forward section 14 and intermediate section 16 to provide an optical path between the exposure system and the film unit. This folded optical path permits smaller, more compact and convenient camera body design, particularly in the folded or collapsed position of the camera sections. For a more detailed description of the camera construction, reference may be had to the aforementioned Land et al. application, and for a description of the bellows or boot, reference may be had to the U.S. Pat. application of Irving Erlichman, Ser. No. 655,859, filed Jul. 25, 1967, now U.S. Pat. No. 3,479,941.

A film pack 25 adapted to be employed in the apparatus of the invention and including a plurality of film units 26 is shown in FIG. 1 within the camera 10 in position for exposing the photosensitive elements of the film units. Film pack 25 includes a container 28 having a forward wall 30 which includes a light-transmitting section in the form of a rectangular opening 32. An end wall 34 extends rearwardly from the forward wall and includes an exit slot 36 for withdrawing film units one at a time from container 28 following exposure thereof. Another end wall 35 extends rearwardly from forward wall 30 and a rear wall 37 is joined to end walls 34 and 35 to enclose the back of container 28. There is a light sealing and pressure member 39 located within container 28 between the rear wall 37 and the film units 26. The rear wall 37 is made from a resilient metal material (for example) and biasing means for urging the member 39 and the film units 26 toward forward wall 30 are provided by partially cutting out and bending away from the rest of rear wall 37, a pair of spring arms 41 which engage member 39 as shown in FIG. 1.

The film units 26 depicted in the drawing are preferably of the so-called "self-developing" type shown and described in U.S. Pat. applications of Edwin H. Land, Ser. No. 622,287, and Edwin H. Land et al., Ser. No. 622,286, now abandoned, both filed Mar. 10, 1967. Each film unit of this type incorporates all of the materials necessary to produce a positive photographic image, including, for example, a photosensitive sheet 38 cooperatively combined in superposed relation with a transparent, image-receiving sheet 40. Each film unit also includes at one end thereof, a rupturable pod or container 42 of a liquid-processing agent adapted to be distributed from the container between and in contact with the two sheets.

Camera 10 is shown in FIG. 1 as including means for holding the container of film units arranged within the camera in position for exposure of the forwardmost film unit. In the form shown these holding means comprise rear wall 44 which cooperates with other components of the main body section of the camera to provide a storage chamber for holding film container 28. The forward side of this storage chamber includes support means in the form of a wall 46 formed with an opening 48 for engaging the forward wall 30 of the film container 28 for locating the forwardmost film unit 50 in position for exposure. Rear wall 44 may be pivotally coupled to the remainder of main body section 12, thus providing a door adapted to be opened to permit loading of a film assemblage into the storage chamber within the camera.

Figure 2:
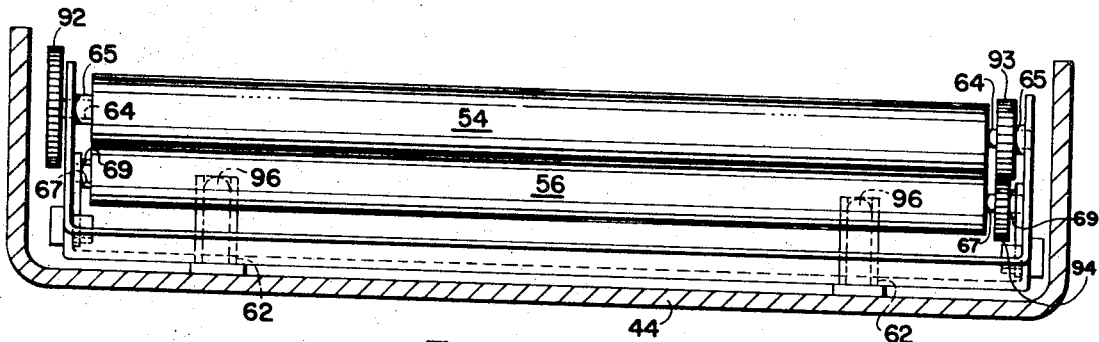
FIG. 2 is a sectional view taken substantially along the line 2–2 of FIG. 1 showing the processing means mounted on the camera body.
Figure 3:
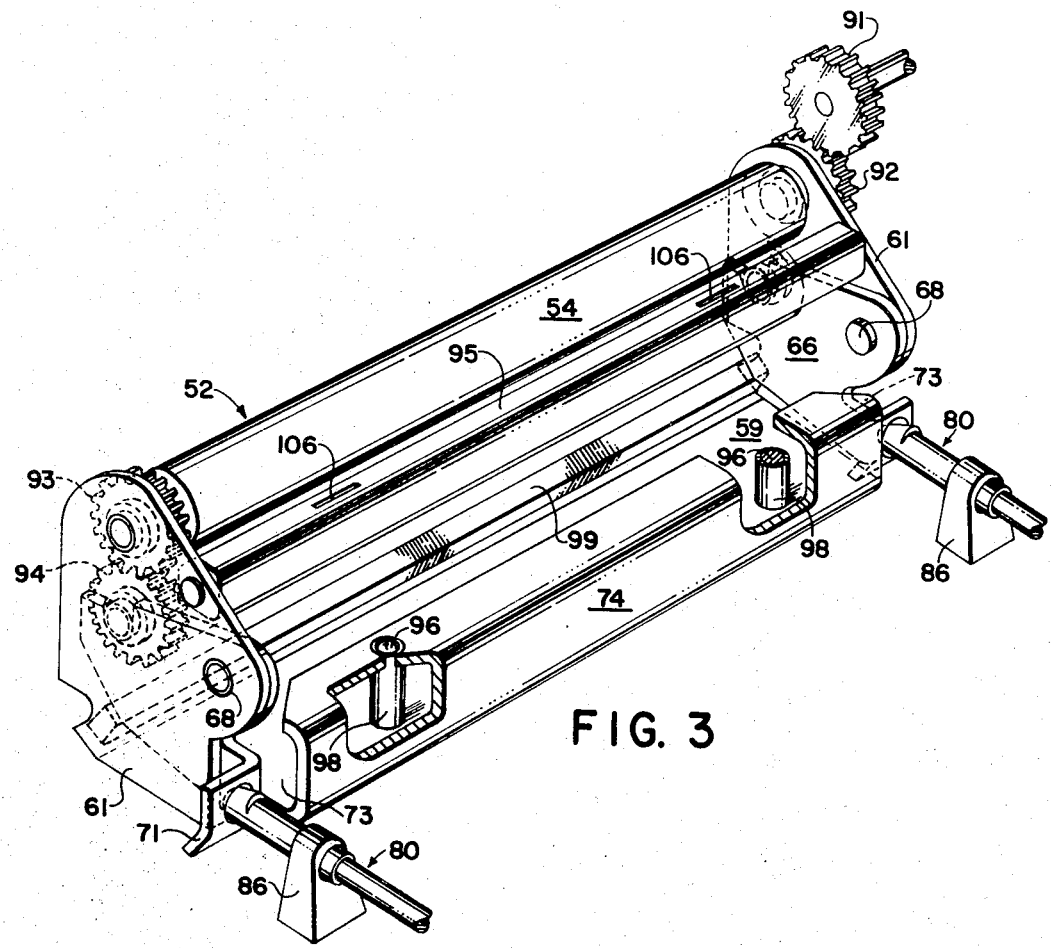
FIG. 3 is a perspective and partially schematic view of the processing means and cooperative camera structure.

The unitary removable processing means of the invention are indicated generally at 52, as shown in FIGS. 1—3, and include a generally U-shaped chassis 58 having a transverse base portion 59 and two dependent end portions 61. The chassis 58 supports all elements of the processing structure to form a removable unit within the camera. The chassis 58 includes a pair of openings 62 in base portion 59, which serve to position the chassis on the rear wall 44 of the camera body as described later in detail. A pair of pressure-applying rollers 54 and 56 are supported on the chassis in position for processing the film units exposed within the camera. The pressure-applying roller 54 is rotatably mounted directly upon the chassis and for this purpose includes a pair of shafts 64 extending from the ends of the roller. A pair of bushings 65 are mounted in openings in chassis 58 for receiving shafts 64 for rotation therein. A pair of pivotal arms 66 are connected to the chassis for rotatably supporting a second pressure-applying roller 56. Roller 56 includes a pair of shafts 67 extending from the ends thereof. A pair of rivets 68 pivotally support the arms 66 on the chassis and a portion of each arm is cut out to receive a pair of bushings 69 which receive the shafts 67 of roller 56 for rotation therein. The transverse base portion 59 of chassis 58 includes a bent-up portion 74 and a pair of openings 73 are provided between portion 70 and the end portions 69 of chassis 58. Each of the arms 66 has an edge portion 71 which extends through openings 73 to serve as a means to apply pivotal force to arms 66. The force is applied to the arms 66 by biasing means to be described which push against the edge portions 71 to pivot arms 66 clockwise and urge roller 56 toward roller 54 to apply pressure to the film units passing between the rollers.

The camera 10 has included therein the aforementioned biasing means for coacting with the support arms 66 for urging the roller 56 rotatably supported thereby toward roller 54 supported upon chassis 58 for applying pressure to the film units. The form of biasing means shown generally at 80 in FIGS. 3 and 4 include a pair of reciprocable plunger-type members 82 having a circular cross section and mounted on each side of the camera body. Two pairs of supports 86 and 87 (one each of which is shown in FIG. 4) are mounted on each side of the camera body and include openings 83 and 85 therein to guide members 82 in the reciprocal movement. A pair of tension springs 84 (one of which is shown) are connected at one end to the supports 86 on the camera body and at the other end a portion of the springs engage the members 82 or an element 89 secured thereto to displace members 82 to the left as viewed in FIG. 4. A tension spring is utilized since such a spring will exert a more predictable force than a compression spring which might buckle in a manner similar to a flexible column under too great an axial load.

The portion 88 of each member 82 engages the edge portion 71 of each arm 66 for pivoting the arms clockwise and urging the rollers 56 supported thereon toward the roller 54 supported directly on the chassis. Thus a film unit passing between the rollers will be subject to compressive pressure due to the biasing means 80. This arrangement also accommodates the varying thickness of each film unit as it passes between the rollers since the spring-biased arms 66 may pivot in either direction to automatically adjust to the film unit thickness. The edge portions 71 are indented at 90 to form to the portion 88 of member 82 so that when the processing means is in its operative position the indentations will receive the portions 88 assuring properly aligned engagement so that the force transmitted by the members 82 will be equally applied to each arm 66.

The camera 10 includes means for advancing the film units 26 from their exposure position within the film container 28 into the bite between the processing rolls. This includes a film engaging or pick member 76 and driving means 78 for selectively reciprocating the pick member which engages a slot in each film unit 26 as described in detail in copending U.S. Pat. application Ser. No. 764,142, filed Oct. 1, 1968.

In order to automate the processing of the film units and to insure that the film units pass between the rollers at a constant predetermined speed drive means such as a motor is mounted on the camera 10 and suitable transmission means are provided on the camera and connected to rollers 54 and 56 to selectively rotate the latter. The motor 90 is preferably electrically powered and may be mounted in section 14 of the camera housing. The transmission means on the camera are schematically represented by gear 91, shown in FIG. 3, which may be part of a gear train or other suitable motion transmission means driven by motor 90. The transmission means connected to rollers 54 and 56 include gear 92 mounted on shaft 64 of roller 54 in driving connection with gear 91. Another gear 93 is mounted on shaft 64 on the other end of roller 54 in driving connection with a gear 94 mounted on shaft 67 of roller 56 Thus after each exposure the motor 90 is activated and the exposed film unit is driven between the rollers while the rollers apply compressive pressure thereto As the pod 42 is compressed it is caused to open and the liquid therein is ejected for subsequent spreading between the sheets in a direction opposite to the direction of travel of the sheets between the rollers. An elongated member 95 is mounted at its ends on end member 61 of chassis 58 so that it is positioned between said film container 28 and said rollers 54 and 56 when said processing means 52 is in its operative position. Member 95 includes a surface 97 located adjacent rollers 54 and 56 in position for contacting each film unit ahead of the line at which the rollers apply pressure to the film unit during processing. The surface 97 aids in controlling the distribution of the liquid over the sheets, for example, by controlling the shape of the leading edge of the liquid mass as it is advanced between the sheets. The member 95 also serves to rigidify the structure of the chassis 58. After the exposed film unit passes between the rollers it may pass out of the camera through an exit opening (not shown) as the processing of the film unit may be completed in the light.

The same biasing means 80 which aid in applying compressive pressure to the film units also serves as a means for retaining the removable processing means in operative position within the camera 10. The camera 10 and in particular the main body section 12 includes means for positioning the processing means in operational position. In the form illustrated in FIGS. 1 and 2 the positioning means include a pair of positioning members such as pins 96 extending from the camera body section 12 and through the pair of openings 62 provided in the transverse base portion 59 of chassis 58. A pair of guide members 98 are seated in openings 62 to aid in seating the chassis properly on the pins 96 as shown in FIG. 1. The guide members 98 have tubular walls which conform to the surfaces of pins 94 so that once the ends of the pins enter the guide members the straight walls thereof will only allow a substantially straight motion of the chassis as it is seated on the pins. The end portions of guide members 98 may also be supported in openings on the bent-up portion 74 of the chassis. As the chassis 58 is seated on the pins 96 the biasing means 80 including the spring-biased reciprocal members 82 coact with the support arms 66 and the pins 96 to retain or clamp the processing means 52 in its operative position. The pins 96 actually support the chassis 58 and structure supported thereby against the biasing means 80. One may, however, with a slight amount of force lift the chassis 58 off the pins forcing the members 82 to recede slightly and disengage from the edge portions 71 allowing the processing means 52 to be removed from the camera. A limiting member 100 is mounted on each member 82 to prevent the latter members from being displaced too far to the left as viewed in FIG. 4 when the processing means 52 is removed from the camera. After removal the arms 66 supporting roller 56 are free to pivot counterclockwise, as viewed in FIGS. 1 and 4, until they strike a stop member 99 on chassis 58 thus allowing the roller 56 to separate from roller 54 for cleaning. The assembly may then be held under running water to clean the surfaces of the rollers 54 and 56 which will be completely exposed. The stop member 99 is positioned to limit the amount of pivotal movement of arms 66 so that the gear 94 mounted on the shaft 67 of roller 56 does not disengage from gear 93 mounted on shaft 64 of roller 54 during the movement of roller 56 so that when the processing means is returned to its position within the camera the gears 93 and 94 are still in driving engagement.

As an additional aid for positioning the processing means 52 the surface of elongated member 95 is provided with a pair of openings or grooves 106, as shown in FIG. 3. A member 107 rigidly mounted on and extending from the camera body includes a pair of extensions 108 (one of which is shown) which are received in grooves 106 when the rear wall 44 carrying the processing means 52 is in its closed position as shown in FIG. 1. Thus the extensions 108 will prevent any torque which may result from driving the rollers 54 and 56 from displacing the processing means from its proper operational position.

It can be seen from the foregoing that the apparatus described, especially the processing means which is removable as a unit by merely lifting the chassis from the positioning means, facilitates cleaning and/or repair or replacement of the unit without undue effort or loss of time. Further advantages of the invention reside in the utilization of the same relatively simple and inexpensive biasing means described to perform the important functions of both applying compressive pressure to the film units passing between the rollers and for retaining the processing means in its operative position on the camera body.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. Photographic apparatus for processing a photosensitive element by distributing a processing liquid in contact therewith, said apparatus comprising, in combination:
   processing means for distributing processing liquid in contact with a photosensitive element, said processing means being removable from said apparatus and including:
   a pair of juxtaposed rollers for distributing processing liquid in contact with a photosensitive element during movement thereof between said rollers;
   a chassis rotatably supporting one of said rollers; and
   support means mounted on said chassis for pivotal movement relative to said chassis, the other of said rollers being mounted on said support means for rotation about an axis substantially parallel with the axis of rotation of said one roller; and
   biasing means mounted on said photographic apparatus for coacting with said support means for retaining said chassis in said apparatus and for pivoting said support means relative to said chassis and thereby urging said other roller toward said one roller.

2. Photographic apparatus including a removable processing means as described in claim 1 wherein said biasing means include at least one spring biased member mounted on said photographic apparatus for engaging said support means.

3. Photographic apparatus including a removable processing means as described in claim 1 wherein said biasing means include a pair of reciprocating members mounted on said apparatus and a spring associated with each of said members to bias said member into engagement with said support means.

4. Photographic apparatus including a removable processing means as described in claim 1 wherein said support means comprise a pair of arms for supporting said other roller, each of said arms including an edge portion extending outwardly from the remainder of said arm, the edge portion being engageable by said biasing means for pivoting said arms and urging said other roller toward said one roller.

5. Photographic apparatus including a removable processing means as described in claim 4 wherein said biasing means for engaging said edge portions include a pair of reciprocating members mounted on said apparatus and a tension spring associated with each of said members to bias said members into engagement with said edge portions.

6. Photographic apparatus including a removable processing means as described in claim 5 wherein each of said edge portions is indented to receive an end portion of one of said reciprocating members in properly aligned position.

7. Photographic apparatus as described in claim 1 including means for positioning said removable processing means in operational position on said apparatus comprising at least one member extending from said apparatus and at least one opening on said chassis for receiving said member; said biasing means, said support member and said member extending from said apparatus coacting to locate said chassis in said apparatus in operational position.

8. Photographic apparatus as described in claim 1 including means for positioning said removable processing means in operational position on said apparatus comprising a pair of tubular guide members mounted on said chassis and a pair of positioning members mounted on and extending from said apparatus into said guide members for guiding said processing means during movement thereof into and from operational position in said apparatus.

9. Photographic apparatus as described in claim 8 wherein said positioning members engage and cooperate with said guide members to support said chassis against said biasing means.

10. Photographic apparatus as described in claim 1 including a member mounted on said chassis having a surface located adjacent said pair of rollers for controlling the distribution of processing liquid on said photosensitive sheet and means on said apparatus for engaging said member for securely positioning said processing means in operative position during operation thereof.

11. Photographic apparatus as described in claim 1 including drive means mounted on said apparatus, first transmission means on said apparatus coupled with said drive means and driven thereby and second transmission means coupled with one of said rollers for transmitting driving power from said drive means to said one roller to rotate the latter.

12. Photographic apparatus as described in claim 11 including means for rotating the other of said rollers comprising third transmission means coupled with the other of said rollers and said second transmission means coupled with said one roller.

13. Photographic apparatus as described in claim 12 wherein said second transmission means coupled to said one roller comprises a first gear mounted on said roller for movement with said one roller and said third transmission means coupled with said other roller comprises a second gear mounted on said roller for movement with said other roller, said first and second gears being coupled in driving engagement when said processing means is in operative position in said apparatus.

14. Photographic apparatus as described in claim 13 including means for preventing disengagement of said first and second gears when said processing means is removed from said apparatus and said other roller mounted on said support means is no longer urged toward said one roller by said biasing means.

15. Photographic apparatus as described in claim 14 wherein said means for preventing disengagement of said first and second gears comprises a member on said chassis engaging said support means for limiting the pivotal movement of said support means in a direction causing separation of said rollers.